F. H. GROVE.
TRIMMING DEVICE.
APPLICATION FILED MAR. 16, 1920.
1,424,012.
Patented July 25, 1922.
2 SHEETS—SHEET 1.
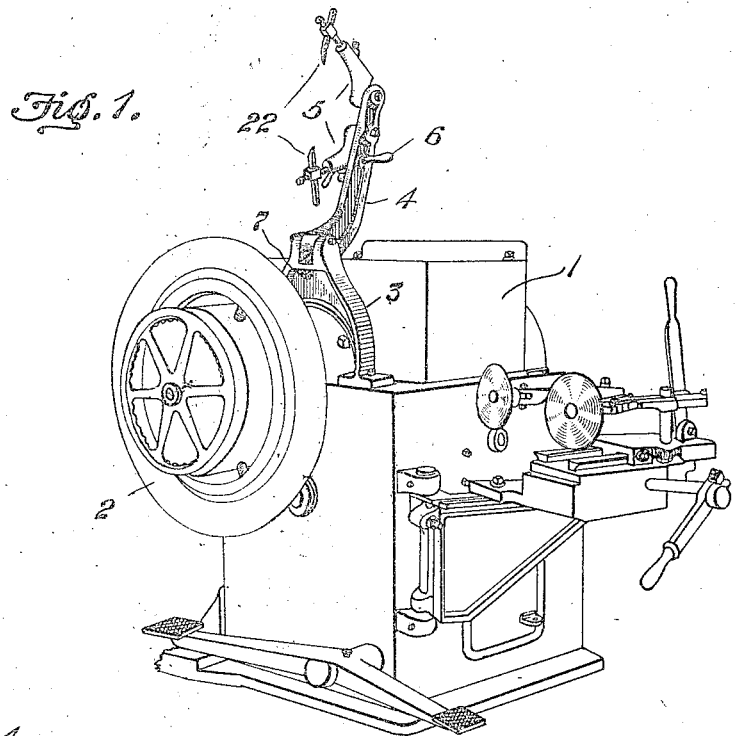
Fig. 1.
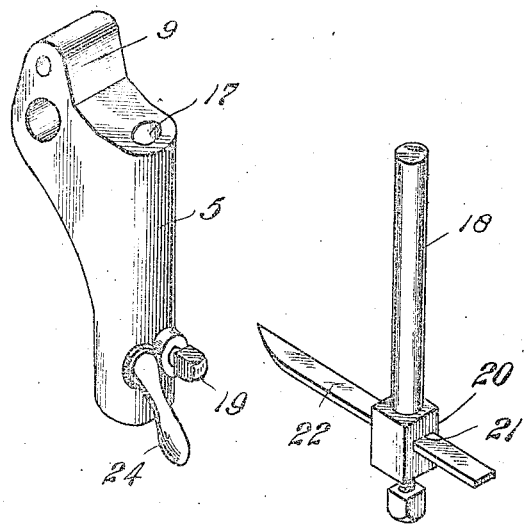
Fig. 4.
Fig. 5.
INVENTOR,
F. H. Grove.
BY Freese, Merkel, Saynell and Bond
ATTYS.

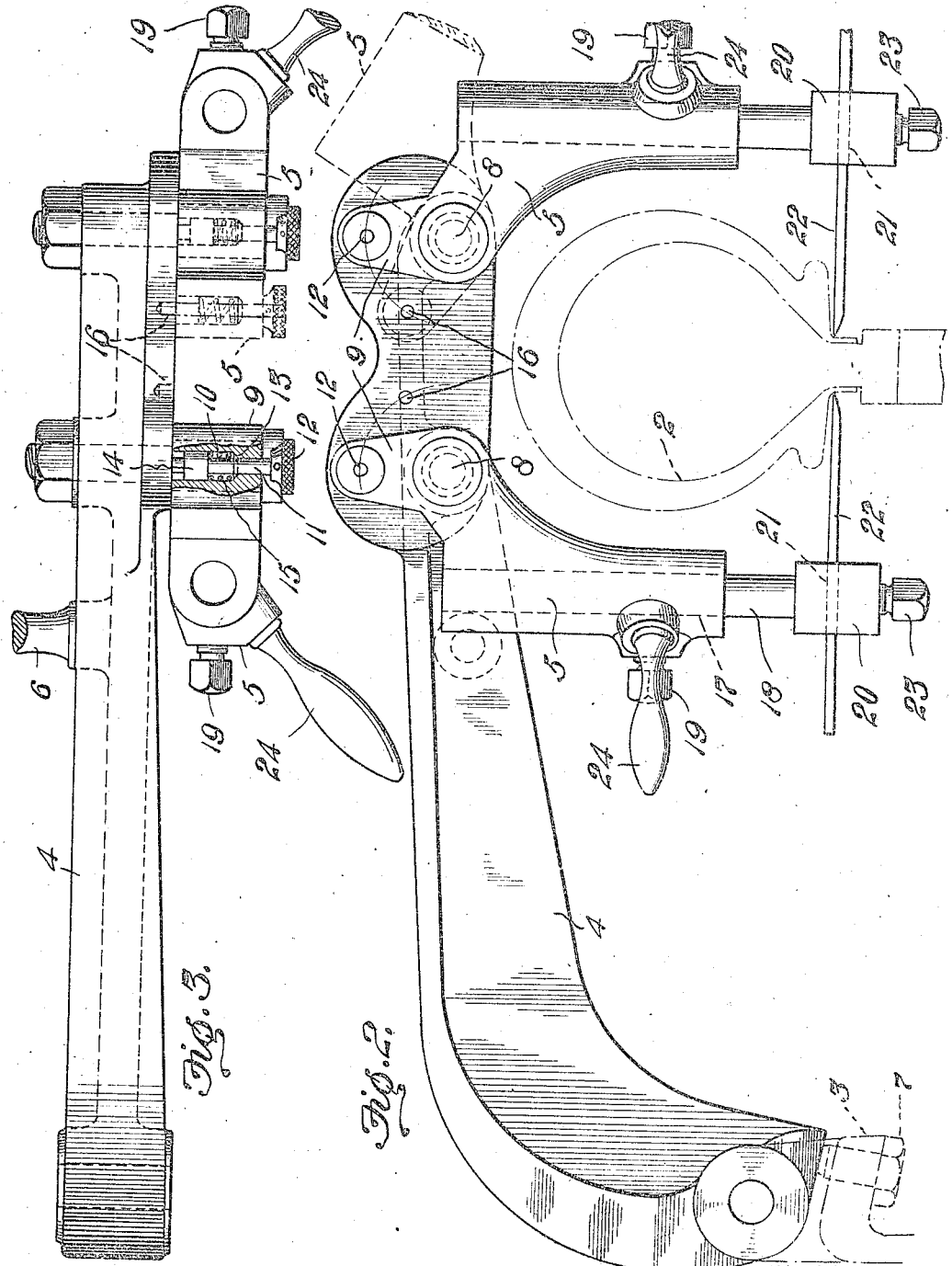

UNITED STATES PATENT OFFICE.

FRANK H. GROVE, OF COLUMBIANA, OHIO, ASSIGNOR TO THE BANNER MACHINE COMPANY, OF COLUMBIANA, OHIO, A CORPORATION OF OHIO.

TRIMMING DEVICE.

1,424,012.

Specification of Letters Patent. Patented July 25, 1922.

Application filed March 16, 1920. Serial No. 366,269.

*To all whom it may concern:*

Be it known that I, FRANK H. GROVE, a citizen of the United States, residing at Columbiana, in the county of Columbiana and State of Ohio, have invented a new and useful Trimming Device, of which the following is a specification.

This invention relates to machines for forming the outer casings for pneumatic tires and more particularly to a trimming device which forms a part of this machine.

The objects of the invention are the provision of a machine designed to build tire casings and provided with a simple and efficient trimming device arranged to co-operate with the rotary core upon which the tire casings are built, to trim the rough edges and surplus fabric from each casing before it is removed from the core.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which—

Figure 1 is a perspective view of a tire building machine provided with the improved trimming device.

Fig. 2 is a side elevation upon an enlarged scale of the trimming device, showing the operation thereof.

Fig. 3 is a plan view of the device, parts being broken away for the purpose of illustration.

Fig. 4 is a detail perspective view of one of the individual arms which carries a trimming knife, and Fig. 5 is a detail perspective view of one of the trimming knives and the rod upon which it is adjustably mounted.

A practical embodiment of the invention is disclosed in the accompanying drawings, forming a part of this specification in which similar numerals of reference indicate corresponding parts throughout the several views.

Referring to Figure 1 of the drawings the frame of a tire building machine, which may be of any usual and well known construction is designated by the numeral 1, the rotatable core 2 being mounted thereon and arranged to receive the fabric strips from which the tire casing is built in the usual manner. The present invention relates more particularly to the trimming device which is mounted upon the frame 1 and arranged to be brought into position relative to the core 2 to trim the surplus fabric from the tire casing which has been built upon the core 2.

This trimming device comprises the bracket 3 which is attached to the frame 1 and to which is hingedly connected the arm 4 arranged to be swung into position above the rotating core, independent arms 5 being pivotally mounted upon said swinging arm and provided with suitable trimming knives arranged to be brought into engagement with each side of the tire casing to trim the surplus fabric therefrom.

A handle 6 is provided upon the arm 4 for swinging the same into the operative or inoperative positions. The arm 4 is arranged to normally remain in the inoperative position shown in Fig. 1 and a set screw 7 is provided in the bracket 3 for the purpose of limiting the downward movement of the arm when it is swing into the operative position. The set screw may be adjusted to regulate the movement of the arm 4 to accommodate cores of different diameters.

The individual arms 5 are pivoted near the outer or free end of the swinging arm 4 at spaced points 8. Each of these arms is provided with the off-set angular portion 9 provided with a bore 10 within which is slidably mounted a spring pressed pin 11 having a knurled head 12.

The bore 10 is provided with a shoulder 13 and between said shoulder and the enlarged portion 14 of the pin a coil spring 15 is mounted. Sockets 16 are formed in the arm 4 and arranged to receive the extremities of the pins 11 when the individual arms 5 are swung into the inoperative position as indicated in dotted lines in Figs. 2 and 3.

Each of the arms 5 is provided with a longitudinal bore 17, a rod 18 being mounted within said bore and held in any desired adjustment by means of a set screw 19. A block 20 is carried upon the lower end of each rod 18 and provided with a transverse slot 21 through which is mounted a trimming knife 22, a set screw 23 in the block holding the trimming knife in any desired adjustment. Handles 24 are provided upon the individual arms 5 by means of which the trimming knives may be operated for trimming the surplus fabric from the tire casing as shown in Fig. 2.

During the operation of building the tire upon the rotary core 2 the swinging arm 4 will be located in the inoperative position shown in Fig. 1 and the individual arms 5 will be located in the inoperative position as shown in said figure, the pins 11 engaging the sockets 16 in the swinging arm 4.

When the tire casing has been completed and it is desired to trim the rough edges of surplus fabric from the casing the swinging arm 4 is moved into the operative position as shown in Fig. 2, by means of the handle 6, and the individual arms 5 are brought into the position shown in Fig. 2, the operator grasping the knurled heads 12 of the pins 11 and pulling said pins out of engagement with the sockets 16, after which the operating handles 24 of the individual arms are grasped by the operator and the arms moved toward the core bringing the trimming knives 22 into engagement with the surplus fabric at the points where it is desired to remove said surplus fabric from the casing and as the core 2 rotates this surplus will be trimmed evenly from the casing.

Although the drawings and above specification disclose the best mode in which I have contemplated embodying my invention I desire to be not limited to the details of such disclosure, for in the further practical application of my invention, many changes in form and construction may be made, as circumstances require or experience suggests without departing from the spirit of the invention, within the scope of the appended claims.

I claim:

1. In combination with a rotatable tire building core, a trimming device including a swinging arm pivoted adjacent said core and arranged to be swung into position above the core, means for automatically stopping the arm in the desired position, individual arms pivotally mounted upon said swinging arm and arranged to be located upon opposite sides of the core when the swinging arm is moved into operative position and trimming knives carried by said individual arms and arranged to be moved toward the core by the swinging movement of the individual arms.

2. In combination with a rotatable tire building core, a trimming device including a swinging arm pivoted adjacent said core and arranged to be swung into position above the core, individual arms mounted upon said swinging arm and arranged to be located upon opposite sides of the core when the swinging arm is moved into operative position, trimming knives carried by said individual arms and arranged to be moved toward the core, and means for automatically limiting the downward movement of the swinging arm.

3. In combination with a rotatable tire building core, a trimming device including a swinging arm pivoted adjacent said core and arranged to be swung into position above the core, means for automatically stopping the arm in the desired position, individual arms pivotally mounted upon said swinging arm and arranged to be located upon opposite sides of the core when the swinging arm is moved into operative position, trimming knives carried by said individual arms and arranged to be moved toward the core by the swinging movement of the individual arms, and means for normally holding the individual arms in inoperative position.

4. In combination with a rotatable tire building core, a trimming device including a swinging arm pivoted adjacent said core and arranged to be swung into position above the core, individual arms pivotally mounted upon said swinging arm and arranged to be located upon opposite sides of the core when the swinging arm is moved into operative position, trimming knives carried by said individual arms and arranged to be moved toward the core, spring pressed pins carried by said individual arms and sockets provided in said swinging arm arranged to receive said pins to hold the individual arms in the inoperative position.

5. In combination with a rotatable tire building core, a trimming device including a swinging arm pivoted adjacent to said core and arranged to be swung into position above the core, means for automatically stopping the arm in the desired position, individual arms pivotally mounted upon said swinging arm and arranged to be located upon opposite sides of the core when the swinging arm is moved into operative position and adapted to be swung toward or from the core, trimming knives carried at the lower ends of the individual arms and means for automatically holding the individual arms in the inoperative position.

6. In combination with a rotatable tire building core, a trimming device including a swinging arm pivoted adjacent to said core and arranged to be swung into position above the core means for automatically stopping the arm in the desired position, individual arms pivotally mounted upon said swinging arm and arranged to be located upon opposite sides of the core when the swinging arm is moved into operative position and adapted to be swung toward or from the core, trimming knives carried at the lower ends of the individual arms and handles upon the individual arms for swinging the same upon their pivots to move the knives into engagement with the core.

In testimony that I claim the above, I have hereunto subscribed my name.

FRANK H. GROVE.